United States Patent

Suh et al.

[11] Patent Number: 5,954,788
[45] Date of Patent: Sep. 21, 1999

[54] APPARATUS FOR PERFORMING MODULAR MULTIPLICATION

[75] Inventors: Chung Wook Suh, Daejeon; Seok Won Jung, Seoul; Kyung Soo Kim, Daejeon, all of Rep. of Korea

[73] Assignee: Electronics and Telecommunications Research Institute, Daejeon, Rep. of Korea

[21] Appl. No.: 08/984,505

[22] Filed: Dec. 3, 1997

[30] Foreign Application Priority Data

Sep. 9, 1987 [KR] Rep. of Korea ........... 97-46376

[51] Int. Cl.⁶ .................................... G06F 7/72
[52] U.S. Cl. ..................................... 708/491
[58] Field of Search ................... 364/746, 746.1

[56] References Cited

U.S. PATENT DOCUMENTS

| | | | |
|---|---|---|---|
| 5,144,574 | 9/1992 | Morita | 364/746 |
| 5,349,551 | 9/1994 | Petro | 364/746 |
| 5,414,651 | 5/1995 | Kessels | 364/746 |
| 5,742,530 | 4/1998 | Gressel et al. | 364/746 |
| 5,828,590 | 10/1998 | Chen et al. | 364/746 |

FOREIGN PATENT DOCUMENTS 0502712  9/1992  European Pat. Off. .

OTHER PUBLICATIONS

Hardware Implementation of Montgomery's Modular Multiplication Algorithm; Stephen E. Eldridge and Colin D. Walter; vol. 42, No. 6, Jun. 1993; pp. 693–699.

A New Carry–Free Division Algorithm and Its Application to a Single–Chip 1024–b RSA Processor; Andre Vandemeulebroecke, Etienne Vanzieleghem, Tony Denayer, Member IEEE, and Paul G.A. Jespers, Fellow, IEEE; vol. 25, No. 3, Jun. 1990; pp. 748–756.

*Primary Examiner*—David H. Malzahn
*Attorney, Agent, or Firm*—Antonelli, Terry, Stout & Kraus, LLP

[57] ABSTRACT

An apparatus for performing a modular multiplication, including a multiplicand register storing a multiplicand; a multiplier register storing a multiplier; a multiplier word counter counting the number of words of the multiplier register; a partial product calculator calculating a partial product for each word of an output of the multiplicand register and an output of the multiplier register; a first adder adding an output of the partial product calculator to an output of a left word shifter; a quotient estimation calculator estimating a quotient from an output of the first adder and an output of an N modular register; a multiplier multiplying an output of the 2N modular register from an output of the quotient estimation calculator; a multiplexer selecting one of an output of the multiplier and the output of the N modular register from an output of the multiplier word counter; a subtracter subtracting an output of the multiplexer from the output of the first adder; the left word shifter shifting an output of the subtracter to left by one word; and a result register storing the output of the subtracter.

2 Claims, 2 Drawing Sheets

APPARATUS FOR PERFORMING MODULAR MULTIPLICATION

BACKGROUND OF THE INVENTION

1. Field of the Invention

The present invention relates to an apparatus for performing a modular multiplication. More particularly, it relates to an apparatus for performing a modular multiplication using 2N, twice a modular N.

2. Discussion of Related Art

In recent years, remarkable research and development have been devoted to a high-speed modular multiplication in a cryptographic scheme for protecting the content of data. Particularly, a cryptography is much more enforced by using a modular exponentiation against the development of the cryptanalysis system. The modular exponentiation can be performed by repeating modular multiplications, and the speed at the modular multiplication is performed plays an important part in the processing speed of the overall cryptographic algorithm. Accordingly, a high-speed cryptographic scheme is becoming necessary with the tendency of enhancing the processing speed of the modular multiplication. In the modular multiplication, two integers are multiplied and its result is divided by another integer to obtain the residue. According to a conventional modular multiplication, a partial product of a multiplicand as to each word of a multiplier is divided to obtain a residue, or the last word is removed whenever a residue is obtained.

A complicated divider or a modular inverse-multiplier utilizing Euclid algorithm is used in the conventional modular multiplication to get a proper quotient, so there is a limit in enhancement of the processing speed. This makes it difficult to perform the real-time processing to a large-capacity key cryptographic algorithm.

SUMMARY OF THE INVENTION

Accordingly, the present invention is directed to an apparatus for performing a modular multiplication that substantially obviates one or more of the problems due to limitations and disadvantages of the related art.

An object of the present invention is to provide an apparatus for more efficiently performing a modular multiplication at high speed by decreasing the number of operands, having a size smaller than a conventional one.

A second object of the present invention is to provide an apparatus for performing a modular multiplication, which computes a reciprocal as to an estimated quotient using a most significant word of 2N, twice a modular N, in the modular multiplication with respect to a partial product by each word of a multiplier, and then obtains an integer of a product gained by multiplying this reciprocal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for performing a modular multiplication, including a multiplicand register storing a multiplicand; a multiplier register storing a multiplier; a multiplier word counter counting the number of words of the multiplier register; a partial product calculator calculating a partial product for each word of an output of the multiplicand register and an output of the multiplier register; a first adder adding an output of the partial product calculator to an output of a left word shifter; and a quotient estimation calculator estimating a quotient from an output of the first adder and an output of an N modular register.

The inventive apparatus also includes a multiplier multiplying an output of the 2N modular register from an output of the quotient estimation calculator; a multiplexer selecting one of an output of the multiplier and the output of the N modular register from an output of the multiplier word counter; a subtracter subtracting an output of the multiplexer from the output of the first adder; the left word shifter shifting an output of the subtracter to left by one word; and a result register storing the output of the subtracter.

According to the conventional modular multiplication, a final product, obtained by multiplying a multiplicand by a multiplier, is divided by a modular N, or a partial product, obtained by multiplying the multiplicand by each word of the multiplier, is divided by a modular N.

However, according to the inventive apparatus for a modular multiplication with respect to a partial product, obtained by multiplying a multiplicand by each word of a multiplier, with 2N (twice a modular N), after obtaining an estimated quotient by using the most significant 2 words of 2N and its root, a difference is obtained between a value gained from the estimated quotient and a corrected partial product, and its resultant is added to the partial product again, thus correcting the partial product. This process is repeated by the number of words of the multiplier. If a resultant obtained by the modular multiplication with respect to the final partial product is larger than N and smaller than 2N, the modular multiplication is performed again to make the final value N.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

In the drawings:

FIG. 1 is a block diagram of an apparatus for performing a modular multiplication using 2N (twice a modular N) in accordance with the present invention; and FIG. 2 is a block diagram of a quotient estimation calculator in accordance with the present invention.

DETAILED DESCRIPTION OF PREFERRED EMBODIMENT

Reference will now be made in detail to the preferred embodiments of the present invention, examples of which are illustrated in the accompanying drawings.

Figure 1:
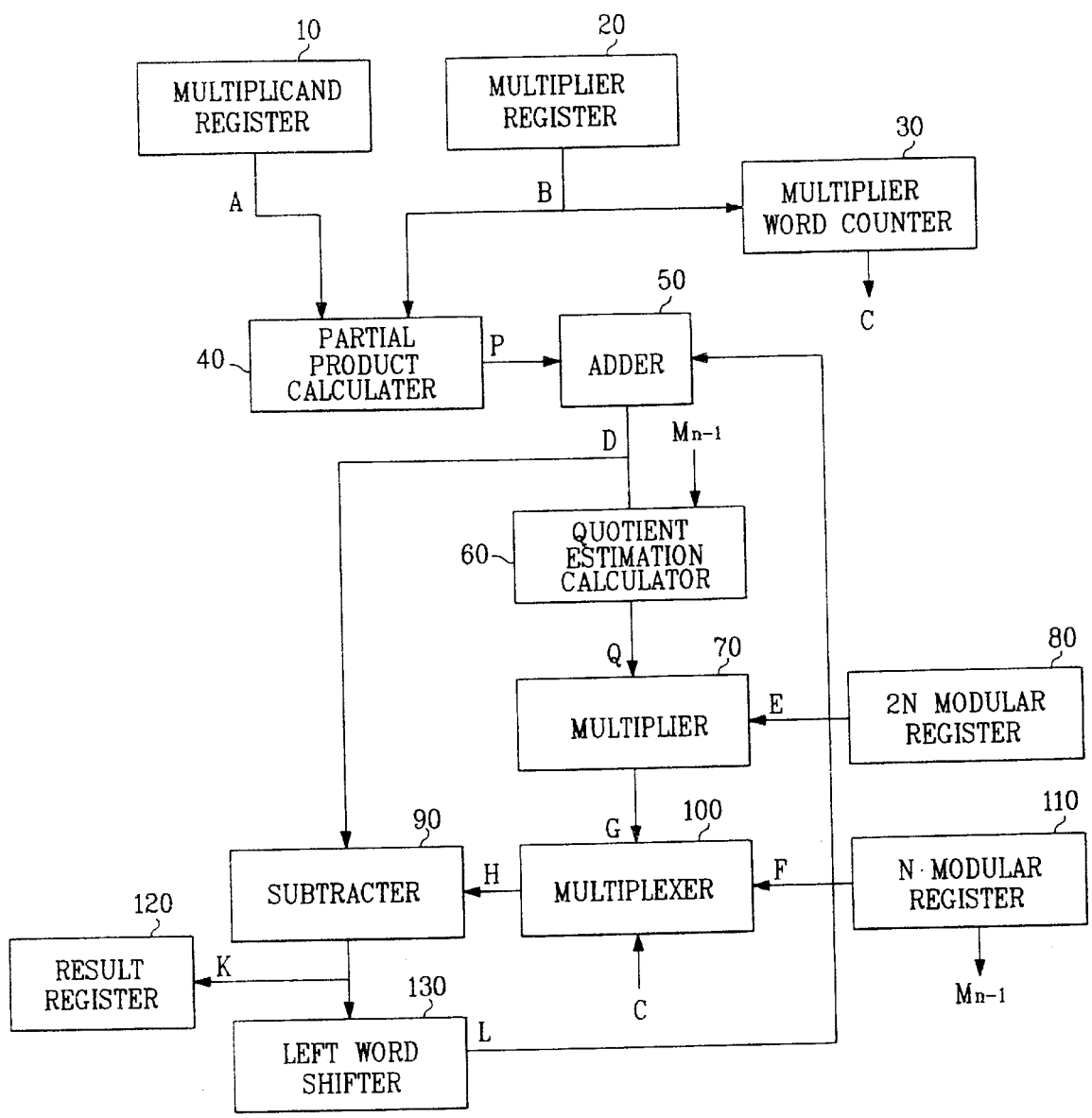

FIG. 1 is a block diagram of a multiplying apparatus using 2N (twice a modular N) in accordance with the present invention. The inventive multiplying apparatus includes a multiplicand register, a multiplier register, a partial product calculator, an adder, a multiplier word counter, a quotient estimation calculator, a multiplier, a subtracter, a multiplexer, a 2N modular register, an N modular register, a result register, and a left word shifter.

As shown in FIG. 1, when a value A of a multiplicand register 10 is multiplied by a value B of a multiplier register 20, a partial product P of a multiplicand for each word of value B of multiplier register 20 is obtained from a partial product calculator 40. Partial product P for each word of value B of multiplier register 20 is added to a value L of a left word shifter 130 by a first adder 50.

In the first operation, value L of left word shifter 130 for the first word of multiplier register 20 equals "0", an initial value, and an output of first adder 50 equals value P of partial product calculator 40. In a quotient estimation calculator 60 an estimated value Q is obtained by using a most significant word $M_{n-1}$ of an N modular register 110 and a root W according to the equation: $Q=W/(W+M_{n-1})$, and estimated value Q is input to a multiplier 70. Multiplier 70 multiplies a value E of a 2N modular register 80 by estimated value Q to send an output G to a multiplexer 100.

Multiplexer 100 produces output G of divider 70 except the case where a multiplier word counter 30 counts the last word of multiplier register 20, and generates an output F of N modular register 110 in case that an output C of multiplier word counter 30 counts the last word of multiplier register 20. A subtracter 90 subtracts an output H of multiplexer 100 from an output D of first adder 50, and produces a resultant value K. If multiplier word counter 30 does not counter the last word of multiplier register 20, output K of subtracter 90 is shifted to left by one word and input to first adder 50 so that output K is added to partial product P.

If multiplier word counter 30 counts the last word of multiplier register 20, a result register 120 storing output K of subtracter 90 produces a final output, thereby completing the operation.

Figure 2:
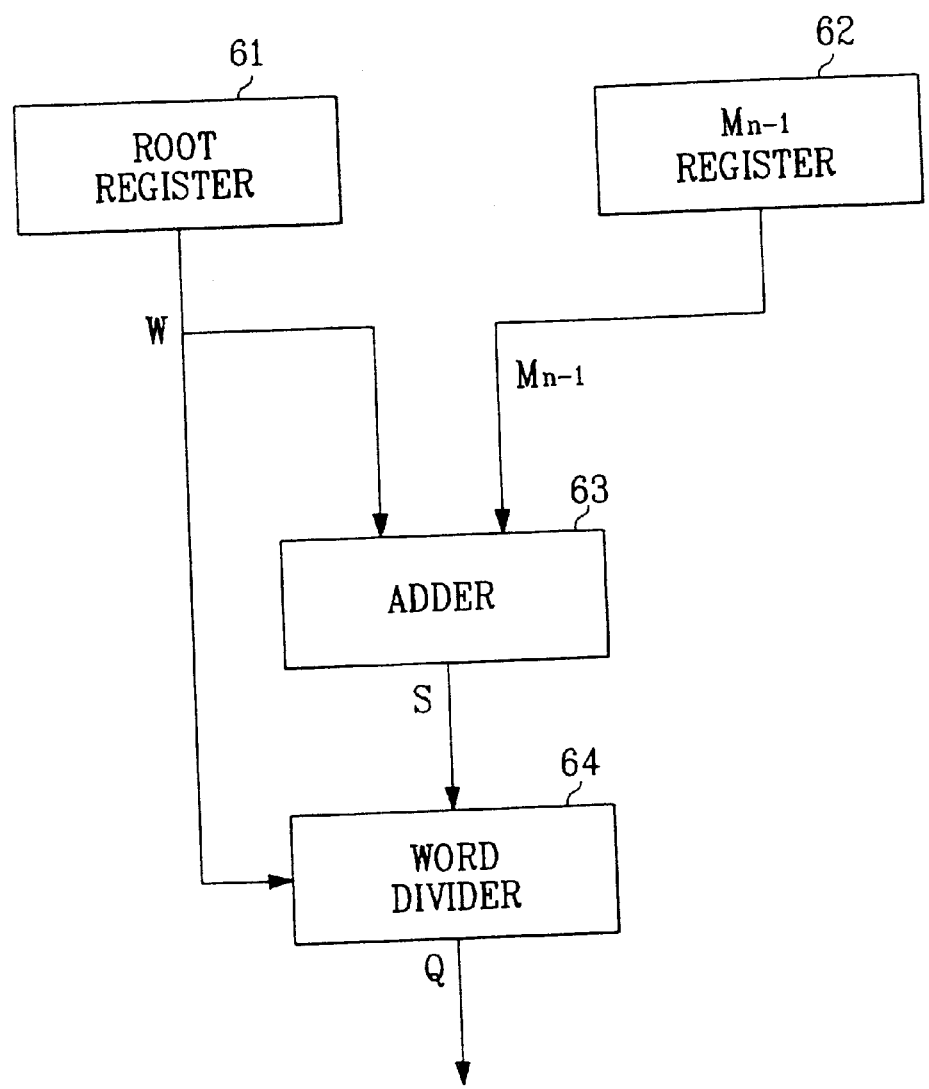

FIG. 2 is a block diagram of the quotient estimation calculator in accordance with the present invention. Quotient estimation calculator 60 consists of a root register 61, a $M_{n-1}$ register 62, a second adder 63, and a word divider 64.

Second adder 63 adds a value W stored in root register 61 to a value $M_{n-1}$ held in $M_{n-1}$ register 62, and outputs its resultant S to word divider 64. Word divider 64 divides value W output from root register 61 by output S of second adder 63 to obtain an integer Q, thus estimating a quotient.

The construction of an apparatus for performing a modular multiplication is described as follows.

An output of multiplicand register 10 receiving a multiplicand for modular multiplication is connected to one input of partial product calculator 40, and multiplier register 20 has an output connected to the other input of partial product calculator 40. The output of multiplier register 20 is also connected to an input of multiplier word counter 30. One input of first adder 50 is connected to an output of partial product calculator 40, and the other input of first adder 50 is connected to an output of left word shifter 130. An output of first adder 50 is connected to an input of subtracter 90.

Multiplier 70 has one input connected to an output of quotient estimation calculator 60, and the other input connected to an output of 2N modular register 80. Multiplexer 100 has one output and three inputs: one input is connected to an output of multiplier 70; another input is connected to an output of N modular register 110; the other input is connected to N multiplier word counter 30. The output of multiplexer 100 is connected to the input of subtracter 90, and subtracter 90 has an output connected to an input of result register 120 and an input of left word shifter 130. Second adder 63 has one input connected to an output of root register 61, and the other input connected to an output of $M_{n-1}$ register 62 receiving the most significant bit from N modular register 110. Word divider 64 has one input connected to the output of root register 61, and the other input connected to an output of second adder 63.

According to the inventive apparatus for performing a modular multiplication for each word of a multiplier, particularly, the modular multiplication is performed for each partial product using the quotient estimation calculator with 2N, twice a modular N, thus ensuring the high-efficiency and high-speed performance. Therefore, if the present invention is applied to a cryptographic scheme for protecting the content of data such as an integrated circuit card, it can provide the high-speed performance and lower the production costs, thus being superior to the presently-available art.

It will be apparent to those skilled in the art that various modifications and variations can be made in the apparatus for performing a modular multiplication of the present invention without departing from the spirit or scope of the invention. Thus, it is intended that the present invention cover the modifications and variations of this invention provided they come within the scope of the appended claims and their equivalents.

What is claimed is:

1. An apparatus for performing a modular multiplication comprising:

a multiplicand register storing a multiplicand;

a multiplier register storing a multiplier;

multiplier word counting means counting the number of words of the multiplier register;

partial product calculating means calculating a partial product for each word of an output of the multiplicand register and an output of the multiplier register;

first adding means adding an output of the partial product calculating means to an output of left word shifting means;

quotient estimation calculating means estimating a quotient from an output of the first adding means and an output of an N modular register;

multiplying means multiplying an output of the 2N modular register from an output of the quotient estimation calculating means;

multiplexing means selecting one of an output of the multiplying means and the output of the N modular register from an output of the multiplier word counting means;

subtracting means subtracting an output of the multiplexing means from the output of the first adding means;

the left word shifting means shifting an output of the subtracting means to left by one word; and a result register storing the output of the subtracting means.

2. An apparatus for performing a modular multiplication according to claim 1, wherein the quotient estimation calculating means comprises:

second adding means adding an output of the N modular register to an output of a root register; and word dividing means dividing the output of the root register by an output of the second adding means.

* * * * *